United States Patent [19]

Lewis et al.

[11] Patent Number: 5,697,739
[45] Date of Patent: Dec. 16, 1997

[54] ANGLE SPINDLE ATTACHMENT

[75] Inventors: David L. Lewis; Victor D. Mogilnicki; Alan C. Lyons, all of Raleigh, N.C.

[73] Assignee: Kennametal Inc., Latrobe, Pa.

[21] Appl. No.: 466,853

[22] Filed: Jun. 6, 1995

[51] Int. Cl.⁶ .................................................... B23C 9/00
[52] U.S. Cl. ........................ 409/230; 409/211; 409/215
[58] Field of Search ................................. 409/215, 216, 409/230, 211, 137, 204, 201; 408/124; 29/40, 39

[56]   References Cited

U.S. PATENT DOCUMENTS

| | | | |
|---|---|---|---|
| 1,991,500 | 2/1935 | Eklund | 409/230 X |
| 2,296,573 | 9/1942 | Richards | 409/230 |
| 2,462,997 | 3/1949 | Roush | 90/11 |
| 2,835,172 | 5/1958 | Barker et al. | 409/211 |
| 3,163,081 | 12/1964 | Vickers | 90/11 |
| 3,752,595 | 8/1973 | Woythal et al. | 408/124 |
| 3,803,978 | 4/1974 | Plevyak | 409/230 X |
| 4,077,736 | 3/1978 | Hutchens | 408/124 X |
| 4,709,455 | 12/1987 | D'Andrea et al. | 29/40 |
| 4,709,465 | 12/1987 | Lewis et al. | 29/568 |
| 4,902,176 | 2/1990 | Sugino et al. | 409/231 |
| 4,981,403 | 1/1991 | Katayama | 409/136 |
| 5,025,548 | 6/1991 | Justesen | 29/560 |
| 5,125,142 | 6/1992 | Koshu et al. | 29/40 |
| 5,385,436 | 1/1995 | Corsi | 409/201 |
| 5,413,439 | 5/1995 | Wu et al. | 409/216 |
| 5,586,382 | 12/1996 | Ganem | 29/560 |

FOREIGN PATENT DOCUMENTS

| | | | |
|---|---|---|---|
| 3345414 | 2/1985 | Germany . | |
| 61-188057 | 8/1986 | Japan . | |
| 62-181849 | 8/1987 | Japan . | |
| 86416 | 4/1991 | Japan | 409/211 |
| 4093106 | 3/1992 | Japan | 409/230 |

*Primary Examiner*—William R. Briggs
*Attorney, Agent, or Firm*—Stanislav Antolin

[57]   ABSTRACT

An angle spindle attachment for a vertically movable spindle unit is provided for rotating a cutting tool in a generally horizontal orientation. The attachment includes a spindle assembly having a drive train that is mechanically independent from the drive train of the vertically movable spindle unit, and a connector block for detachably connecting the spindle assembly at a transverse angle with respect to the vertically movable spindle unit. The connector block may include an angular adjustment mechanism that allows the spindle assembly to be oriented at an angle above or below the horizontal, as well as a rotational adjustment assembly that allows the spindle assembly to be pivotally adjusted about the axis of rotation of the vertically movable spindle unit. The independent drive train of the spindle assembly may be either electrically, hydraulically, or pneumatically powered, and allows the cutting tool to be held more rigidly, operated with less eccentric movement, and turned at speeds that are not limited by the drive train of the vertically movable spindle unit.

28 Claims, 4 Drawing Sheets

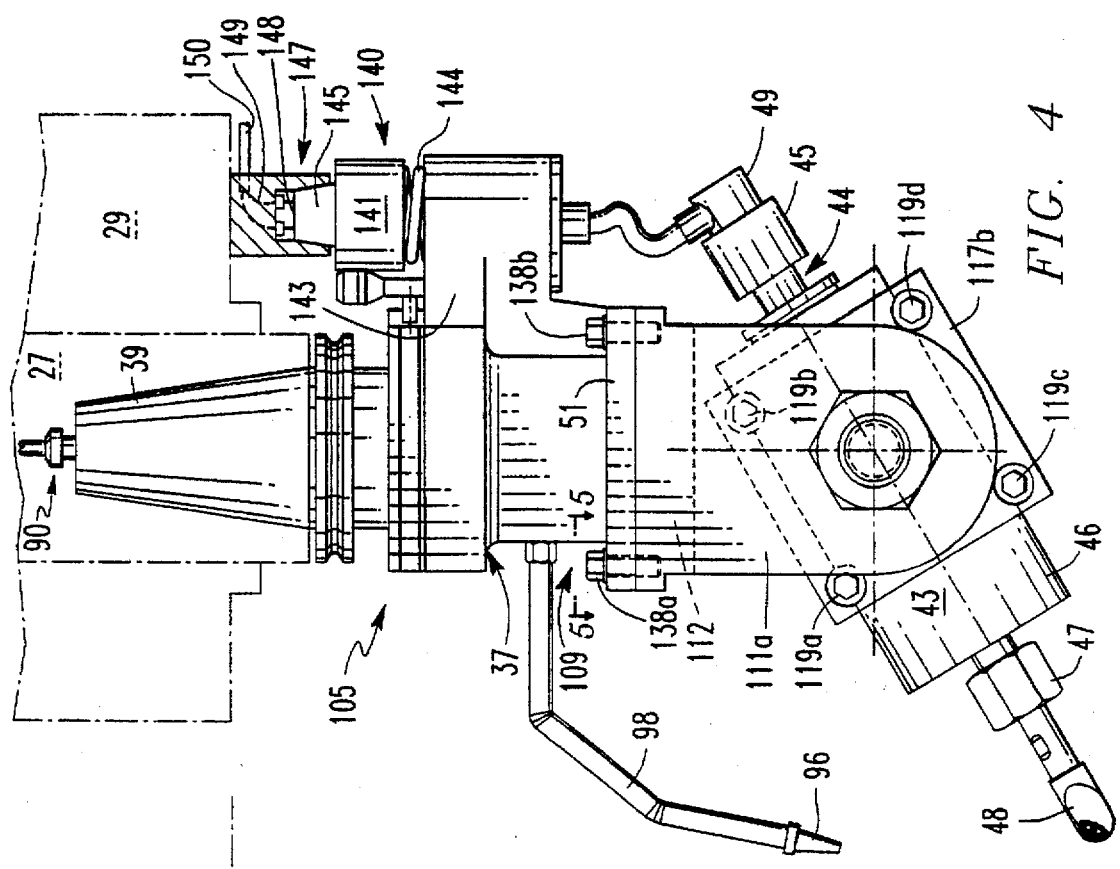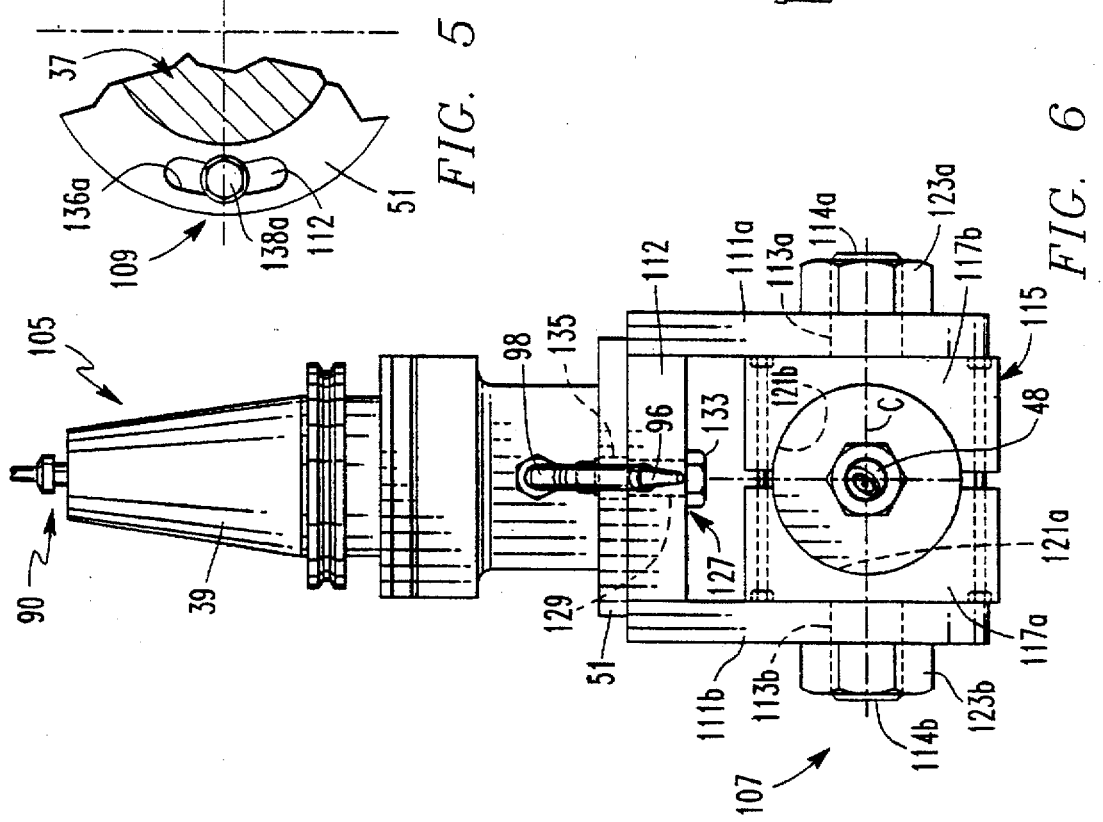

ANGLE SPINDLE ATTACHMENT

BACKGROUND

This invention generally relates to angle spindle attachments that allow a vertically movable spindle unit to hold a rotating cutting tool in a horizontal orientation, and is particularly concerned with such an attachment having a separate spindle assembly with a mechanically independent drive train.

Angle spindle attachments for vertically movable spindle units are known in the prior art. An example of such a spindle attachment is illustrated in FIG. 1. Such attachments typically comprise a housing 3. A vertically-oriented drive shaft 5 is rotatably mounted in the housing 3 via bearings 7a,b,c. A tapered shaft 9 is connected to the upper end of the drive shaft 5. A right angle gear train 11 including of a pair of bevel gears 13a,b is connected to the lower end of the shaft 5. The bevel gears 13a,b transmit power from the vertically-oriented drive shaft 5 to a horizontally-oriented driven shaft 15 that is rotatably mounted in the housing 3 by bearings 17a,b. The driven shaft 15 includes an output end that is connected to a tool coupler 19 for holding a rotating tool 21. Additionally, a stop block assembly 23 having a spring loaded plunger 25 is provided for preventing the transmission of torque to the housing 3.

In operation, the tapered shaft 9 is connected to a female adapter present in the end of a spindle shaft 27 of a vertically operable spindle unit. For the purposes of this application, a "vertically operable" spindle unit shall include units in which either the spindle shafts are vertically movable with respect to a stationary table, or stationary with respect to a vertically movable table (not shown) that holds a workpiece. In either case, the spindle shaft is vertically oriented, rotatably mounted with respect to the headstock, and connected to a drive train 30. In the instant example, the headstock 29 includes a recess 31 for receiving the spring loaded plunger 25 of the stop block assembly 23 when the attachment 1 is mounted as shown. When the spindle shaft 27 is rotated, the rotational energy is transmitted to the rotating tool 21 via driven shaft 15, bevel gears 13a,b, drive shaft 5, and tapered shank 9, while the stop block assembly 23 prevents the housing 3 from rotating along with the drive shaft 5. A coolant system (not shown) may be provided that conducts coolant either through the center of the shank 9 and shaft 5 or through the plunger 25 for directing a stream of coolant at an interface between the rotating tool 21 and a workpiece.

While the prior art angle spindle attachment illustrated in FIG. 1 has proven its utility in machining operations requiring a horizontal orientation of a turning tool, the inventors have noted a number of limitations associated with the design of such an attachment that impair its utility. For example, the applicants have observed that the use of the same drive train used to power the vertically movable spindle shaft limits the speed range at which the rotating tool may be rotated. This is a significant impairment, since there is an ever increasing demand for machines that can drive turning tools at ever faster speeds, both to increase the overall production of the turning tools, as well as the quality of the resulting cuts. While it is possible to modify the gear train in such attachments to obtain perhaps a three to one increase over the rotational speed of the spindle drive shaft, the use of such gear trains increases the size, complexity, and expense of the attachment. A second limitation stems from the necessary use of a right-angled gear train. Specifically, the applicants have observed that the mechanical slack and vibration associated with such gear trains necessitates a certain amount of non-rigidity and eccentric movement in the tool coupler. These effects interfere with the accuracy and smoothness of the resulting cut, and are exacerbated at higher speeds. While the use of spiral-cut gears in the right-angled gear train and fine tolerances in the bearings mounting the driven shaft can ameliorate these effects, such a solution is expensive. Still another limitation stems from the length $L_1$ of the maximum extension of the attachment from the spindle shaft. The longer this length is the less rigid the support for the cutting tool during a cutting operation. While the length $L_1$ could perhaps be made shorter, the necessity for bearings 7a,b, and c places practical limits on the extent to which $L_1$ can be reduced. Finally, there is sometimes a need in a machine shop for an attachment that can orient a rotating tool at an angle other than a right angle with respect to the vertically oriented shaft of the spindle unit. However, the provision of such angular adjustability in a spindle attachment utilizing a right-angle gear train is difficult and expensive, as it requires a more sophisticated gear train constructed to very tight tolerances.

Clearly, there is a need for an improved angle spindle attachment that is capable of turning a tool at speeds far in excess of the rotational speed of the vertical spindle unit from which it depends. Ideally, such an attachment should hold its respective rotating tool more rigidly and introduce less eccentric movement than prior art spindle attachments. Additionally, it would be desirable if such an attachment were capable of a broad range of angular adjustment without the need for a complex and expensive angular gear train.

SUMMARY

Generally speaking, the invention is an angle spindle attachment that overcomes all of the aforementioned limitations associated with the prior art. To this end, the attachment comprises, consists essentially of, or consists of an electrically, hydraulically, or pneumatically powered spindle assembly having a drive train that is mechanically independent of the drive train of the vertically operable spindle unit, and a connector block for detachably connecting the spindle assembly to the vertically operable spindle unit. The spindle assembly has a housing containing the independent drive train, and a tool coupler operably connected to the independent drive train. The connector block holds the spindle assembly relative to the vertically-operable spindle unit such that the axis of rotation of the shaft of the spindle unit and the tool coupler of the spindle assembly intersect one another at a transverse angle which may be a right angle. The connector block is preferably formed from a single, solid casting to maximize rigidity. The block may include a tapered shank at its top end that is connectable to a female adapter at the end of the spindle unit shaft, a stop block assembly on its side that is connectable to the headstock of the spindle unit for preventing the connector block from rotating relative to the headstock, and a clamp at its lower end connectable to the housing of the spindle assembly.

In one embodiment of the invention, the clamp rigidly connects the spindle assembly to the body of the connector block in a single, right-angle orientation such that the axis of rotation of the tool coupler is horizontal. In a second embodiment of the invention, the connector block includes an angular adjustment mechanism for adjusting the angle of the of the axis of rotation of the tool coupler with respect to the horizontal. The angular adjustment mechanism may include a pair of opposing trunnions on opposite sides of a clamp that holds the spindle assembly housing. The trunnions are journaled in openings present in a pair of opposing plates extending down from a bridge plate connected to the bottom of the connector block. The trunnions are threaded, and a pair of locknuts engageable over the threaded ends of the trunnions may further be provided for securing the spindle assembly at a desired angular orientation. In this same embodiment, the stop block assembly may additionally include a rotational adjustment assembly so that the tool coupler may be adjusted along a plane orthogonal to the axis of rotation of the spindle unit shaft, thereby allowing the spindle assembly to be adjusted not just angularly, but also rotationally. A set screw in the rotatable adjustment assembly is used to secure the spindle assembly in a desired orientation along the orthogonal plane. In both embodiments, the connector block preferably has a cooling system for directing a flow of coolant into an interface between a workpiece and a tool driven by spindle assembly. The independent drive train of the spindle assembly may include either an electric, hydraulic, or pneumatic motor, and the stop block assembly may include either an electric, hydraulic, or pneumatic coupling for conducting electricity, pressurized hydraulic fluid, or compressed gas to the motor.

The independent drive train of the angle spindle attachment of the invention allows it to drive a rotating tool at speeds that would otherwise be impractical, if not impossible, if the drive train of the vertically movable spindle unit were employed. The lack of a right-angled gear train of the type associated with the prior art allows the angle spindle attachment to secure and drive a rotating tool more rigidly and with less vibration, resulting in smoother and more accurate cuts. The use of a connector block formed from a single, solid casting further increases rigidity by allowing the length of the maximum extension of the attachment to be substantially shortened. Finally, the combination of the angle adjustment mechanism and the rotatable adjustment assembly in the second embodiment allows the tool coupler of the spindle attachment to be adjusted in more orientations than has previously been accomplished in prior art attachments without the need for a complex drive linkage.

The invention illustratively disclosed herein may suitably be practiced in the absence of any element, step, component, or ingredient which is not specifically disclosed herein.

BRIEF DESCRIPTION OF FIGURES

These and other features, aspects, and advantages of the present invention will become better understood with reference to the following description, appended claims, and accompanying drawings where:

FIG. 4 is a side view of a second embodiment of the attachment of the invention which includes both an angular adjustment mechanism and a rotational adjustment assembly;

FIG. 5 is a plan cross-sectional view of the attachment illustrated in FIG. 4 along the line 5—5 illustrating one of the adjustment screws of the rotational adjustment assembly of the invention; and FIG. 6 is a front view of the attachment illustrated in FIG. 4.

DETAILED DESCRIPTION

Figure 1:
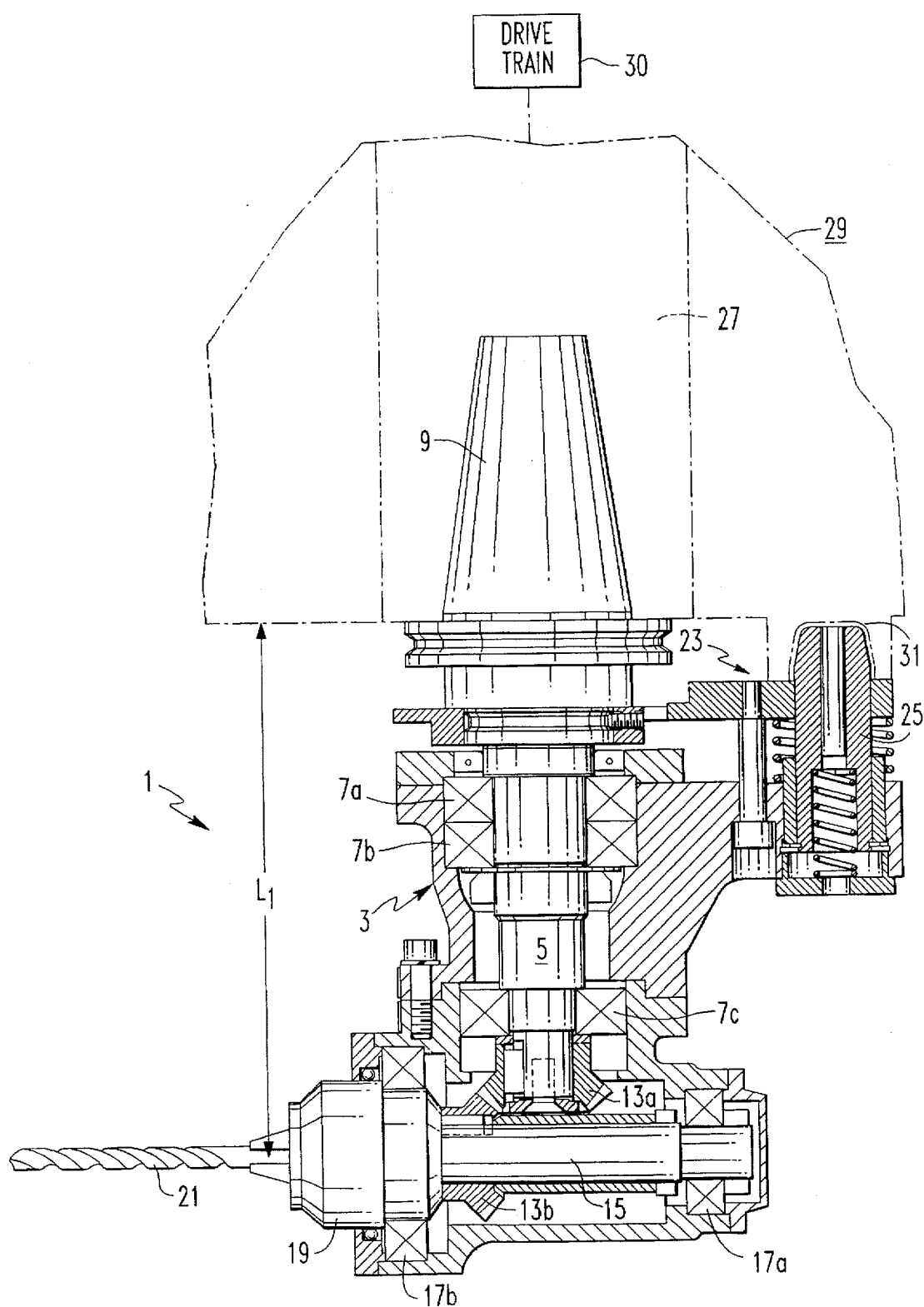
FIG. 1 is a partial cross-sectional side view of a prior art angle spindle attachment.
Figure 2:
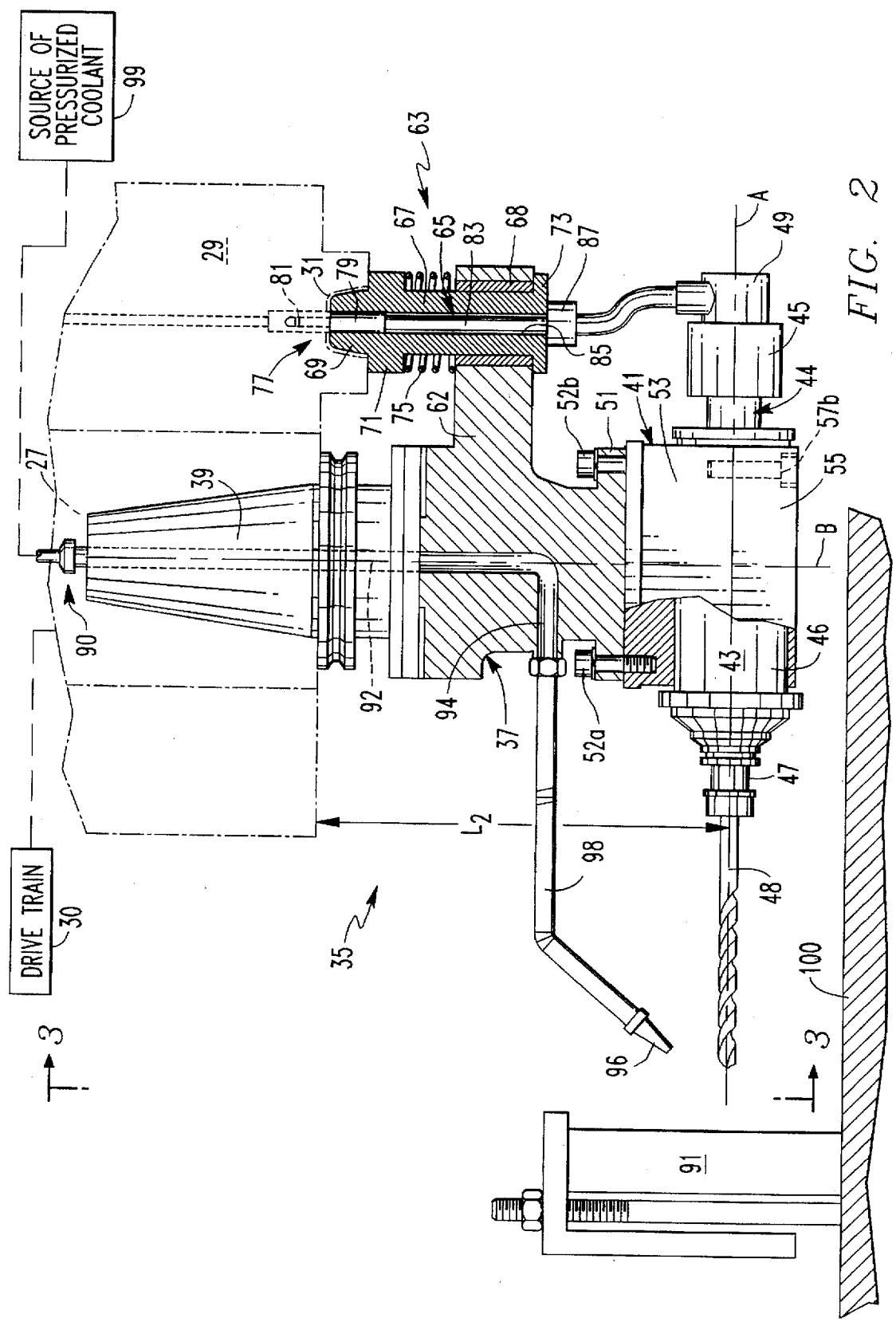
FIG. 2 is a partial side, cross-sectional view of a first embodiment of the angle spindle attachment of the invention.
Figure 3:
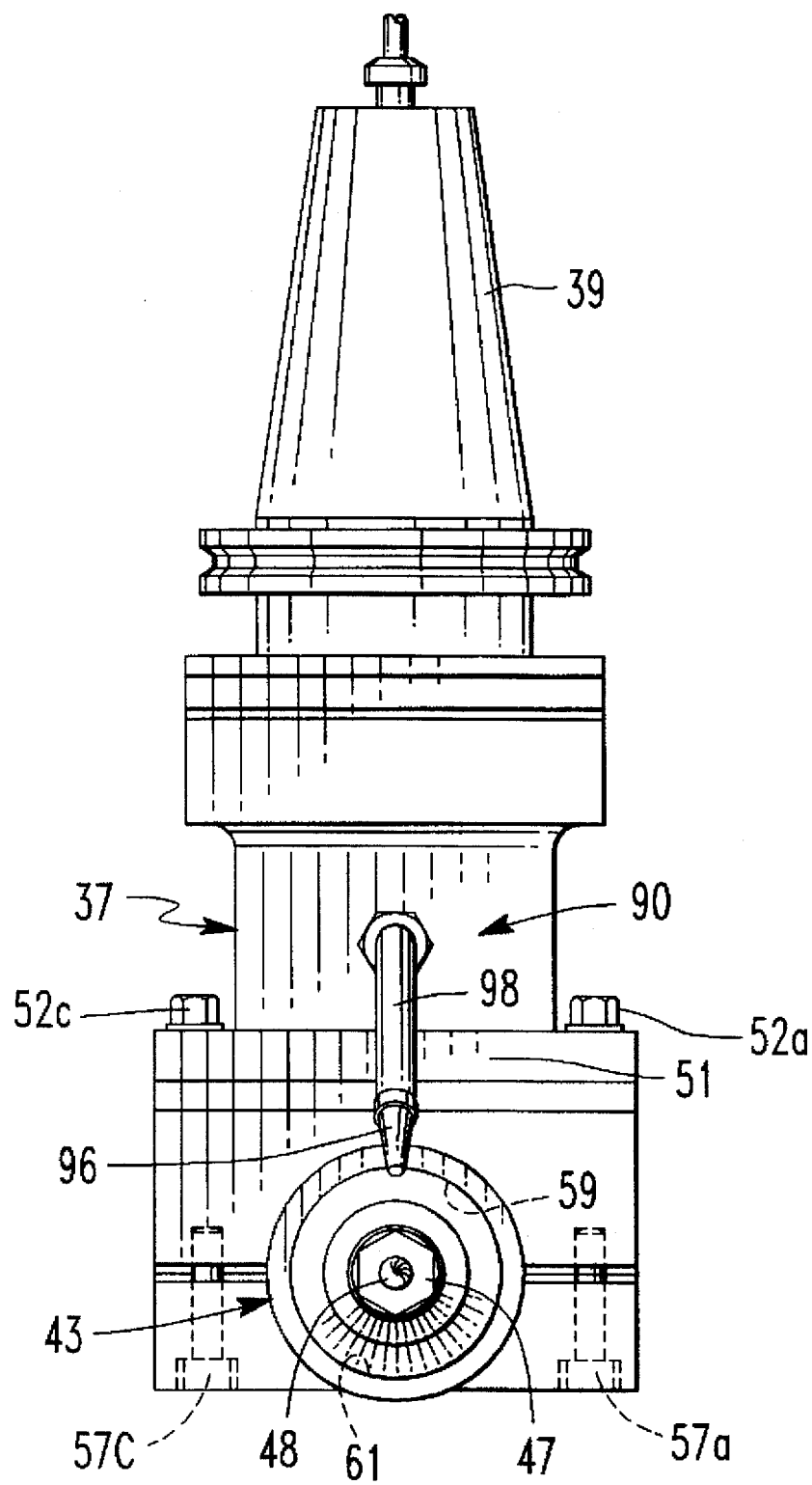
FIG. 3 is a front view of the attachment illustrated in FIG. 2 taken along the line 3—3.

With reference now to FIGS. 2 and 3, wherein like numerals designate like components throughout all the several figures, the angle spindle attachment 35 of the invention includes a connector block 37 having a tapered shank 39 integrally connected to its upper end, and a clamp 41 bolted to its lower end. The connector block 37 is preferably formed from a single, solid steel casting having a relatively short length. Such a design maximizes the rigidity of the attachment 35 in two ways. First, the use of a solid steel casting maximizes the stiffness of body of the attachment. Secondly, the resulting short length of the maximum extent $L_2$ of the attachment 35 allows it to better resist the moment forces applied to it incident to a machining operation. In this preferred embodiment, the connector block 37 has been described as a solid steel casting. More generally, the connector block 37 may be made by any method and from any material that maximizes the rigidity of the attachment 35. The present invention is intended to encompass any material that posses a combination of strength and stiffness that allows the rigidity of the attachment 35 to be maximized including, for example, metals, polymers, ceramics, and composites of combinations thereof.

The tapered shank 39 is detachably connectable to a female adapter of a shaft 27 of a vertically operable spindle unit that is rotatably mounted with respect to a stationary headstock 29. The clamp 41 secures an independent spindle assembly 43 such that its axis of rotation A intersects at right angles the axis of rotation B of the shaft 27 of the vertically-operable spindle unit.

The spindle assembly 43 includes a drive train 44 that is mechanically independent from the drive train (not shown) that drives the spindle shaft 27. The drive train 44 includes a prime mover in the form of a motor 45. While the motor 45 is indicated as being electrically powered in FIG. 2, it may also be hydraulically or pneumatically powered. The motor 45 and drive train 44 are contained within a cylindrical housing 46. At its front end, the housing 46 terminates in a tool coupling 47 which may be a conventional chuck mechanism or other tool holding assembly capable of gripping and ungripping a rotating tool 48 such as a drill. At its back end, the housing 46 terminates in a power terminal 49 for the electric motor 45. The spindle assembly 43 may have its own feeding mechanism which is particularly useful when the attachment 35 orients the cutting tool 48 at an angle to the horizontal. The spindle assembly 43 may be any one of a number of commercially-available cartridge spindles such as, for example, a Model No. SC60 cartridge spindle manufactured by the Precise Corporation located in Racine, Wis.

The clamp 41 extends downwardly from a base flange 51 of the connector block 37 via bolts 52a–d. The clamp 41 is formed from upper and lower clamping sections 53,55 which are secured together by four clamping bolts 57a–d (of which bolt 57d is not visible). The clamping bolts 57a–d each include a hexagonal recess for receipt of an allen wrench. Additionally, the lower clamping section 55 includes recesses as shown for receiving the head portions of the clamping bolts 57a–d so that they do not protrude significantly beyond the bottom portion of the cylindrical housing 46 of the spindle assembly 43. To insure a snug fit between the spindle assembly 43 and the clamp 41, each of the clamping sections 53,55 includes a recess 59,61 that is complementary in shape to the housing 46. In the instant example, each recess 59,61 is semi-cylindrical since the housing 45 is cylindrical.

The connector block 37 further has an arm 62 to which a stop block assembly 63 is mounted. The stop block assembly 63 includes a plunger member 65 having a cylindrical body 67 that is reciprocally movable in a bushing 68 mounted in the connector block arm 62. The upper end 69 of the plunger member 65 is conically tapered as shown and is receivable within a complementarily-shaped recess 31 in the headstock 29 of the vertically-operable spindle unit. Upper and lower stop flanges 71,73 define the reciprocating stroke of the plunger member 65 within the bushing 68. A coil spring 75 is compressively engaged between the bottom surface of the lower stop flange 73 and the upper surfaces of the connector block arm 62 and bushing 68 so as to apply an upward biasing force on the plunger member 65. The tapered shape of the upper end 69 of the member 65, in combination with the biasing force applied by the spring 75, secures and centers the upper end of the plunger member 65 into recess 31, thereby firmly preventing the attachment 35 from rotating relative to the headstock 29.

The stop block assembly 63 advantageously includes an electrical coupling 77 for transmitting electrical power to the motor 45 of the spindle assembly 43. The coupling 77 is formed in part from a male electrical connector 79 that extends from the upper end 69 of the plunger member 65. This male electrical connector 79 is matable with a female electrical connector 81 disposed in a recess in the headstock 29. The length of the male electrical connector 79 is preferably no longer than the stroke of the plunger member 65 defined between the upper and lower stop flanges 71,73 to facilitate the removal of the attachment 35 from the spindle shaft 27 and headstock 29. An electrical cable 83 extends from the bottom of the male electrical connector 79 through a centrally disposed bore 85 in the plunger member 65. Cable 83 is electrically connected to a cable coupling 87 that transmits power to the motor 45 via power terminal 49. In the preferred embodiment, the specifics of the electrical coupling 77 are manufactured in conformance with International Standard ISO/DIS 9524 to maximize the versatility of the attachment 35.

The attachment 35 further includes a coolant system 90 for directing a stream of coolant in an interface between a workpiece 91 and a rotating tool 48. The coolant system 90 includes centrally and laterally disposed bores 92,94 extending through the tapered shank 39 and the connector block 37. Coolant is conducted to a nozzle 96 via flexible pipe 98 from a source 99 of pressurized coolant. In the example of the invention illustrated FIGS. 2 and 3, the spindle unit includes a vertically movable, adjustable table 100 for holding a workpiece 91. However, the invention would work just as well if the table 100 were stationary and the shaft 27 and headstock 29 were vertically movable instead.

With reference now to FIGS. 4, 5, and 6, an alternative embodiment 105 of the attachment of the invention includes both an angular adjustment mechanism 107, and a rotational adjustment assembly 109 which, when operated together, allow the axis of rotation A of the tool coupling 47 of the spindle assembly 43 to be moved along the section of a sphere.

The angular adjustment mechanism 107 includes a pair of mounting plates 111a,b mounted on opposite sides of a bridge plate 112 connected to the base flange 51 of the connector block 37. Each of these mounting plates 111a,b includes a centrally disposed bore 113a,b. These bores receive opposing, threaded trunnions 114a,b extending from opposite sides of clamp 115. With the exception of the threaded trunnions 114a,b, the structure of the clamp 115 is quite similar to that of the previously described clamp 41 of the first embodiment of the invention. Specifically, the clamp 115 includes a pair of lateral clamping sections 117a,b which are secured together by means of bolts 119a–d. Both of the sections 117a,b include semi-cylindrical recesses 121a,b which are substantially complementary in shape to the cylindrical housing 46 of the spindle assembly 43. Of course, the recesses 121a,b will in any event be complementary in shape to the spindle housing 46. Locknuts 123a,b are engageable onto the threaded, opposing trunnions 114a,b for securing the axis of rotation A of the tool coupling 47 of the spindle assembly 43 at a desired angle with respect to the horizontal.

The rotational adjustment assembly 109 includes a rotational coupling 127 between bridge plate 112 and base flange 51 of the connector block 37. This rotational coupling 127 is preferably formed from a through bore 129 centrally disposed in the bridge plate 112, and a bolt 133 engaged in a centrally-disposed threaded bore 135 in the lower end of the connector block 37. The bolt 133 is not rung completely up into the threaded bore 135 so as to allow bridge plate 112 to rotate with respect to base flange 51. As may best be seen with respect to FIG. 5, the base flange 51 includes a pair of opposing, arcuate adjustment slots 136a,b. Extending through these slots are a pair of set screws 138a,b. Rotational adjustment of a tool held by the spindle assembly 43 is obtained by loosening the set screws 138a,b, and rotating the bridge plate 112 to a desired position within the range allowed by the arcuate adjustment slots 136a,b. Once the desired rotational position has been obtained, set screws 138a,b are retightened.

Like the previously-described angle spindle attachment 35, attachment 105 also includes a stop block assembly 140 having a spring loaded plunger 141 that is reciprocally movable in a bushing (not shown) present in an arm 143 extending from a housing 37. A coil spring 144 biases the tapered end 145 of the plunger 141 into an electrical connector assembly 147. However, instead of being mounted within the headstock 29, the electrical connector assembly 147 of the second embodiment 105 of the invention is merely attached to the under surface of the headstock 29 as shown. Additionally, instead of using a jack-type connector, electrical connector assembly 147 uses a two-pronged male connector 148 that fits into a dual-recessed female connector 149 that also serves to mechanically receive the tapered end 145 of the plunger 141 in the manner shown. The female connector 149 is in turn connected to a power source (not shown) via cable 150. Electrical connector assembly 147 has the advantage of being easily retrofitted on the underside of a headstock 29 and does not require the amount of boring and machining that the electrical coupling 77 of the first embodiment 35 requires. Additionally, it should be noted that the female connector 149 provides not only an electrical female connection for the two-pronged male connector 148, but also a mechanical connection for the tapered end 145 of the spring loaded plunger 141 as well.

While this invention has been described with respect to two embodiments, various modifications, additions, and variations will become evident to persons of ordinary skill in the art. All such modifications, additions, and variations are intended to be encompassed within the scope of this patent, which is limited only by the claims appending hereto.

What is claimed is:

1. An angle spindle attachment for a spindle unit that is vertically operable with respect to a workpiece, said unit including a spindle shaft rotatably mounted with respect to a headstock, and a drive train for rotating said shaft, comprising:

a spindle assembly having a drive train that is mechanically independent from the drive train of the vertically operable spindle unit, a housing containing said inde-

7 pendent drive train, and a tool coupling means rotatably mounted in said housing and connected to the mechanically independent drive train for holding a turning tool, and a connector block means for detachably connecting said spindle assembly to said vertically operable spindle unit such that the axis of rotation of said shaft and said tool coupling are transverse to one another, wherein said connector block means includes a tapered shank, which is detachably connectable to a female adapter at an end of said spindle shaft, and a stop block assembly detachably connectable to said headstock for preventing said connector block means from rotating relative to said headstock and wherein said drive train of said spindle assembly includes an electric motor, and said stop block assembly includes an electrical connector for connecting a source of electrical power to said motor.

2. An angle spindle attachment for a spindle unit that is vertically operable with respect to a workpiece, said unit including a spindle shaft rotatably mounted with respect to a headstock, and a drive train for rotating said shaft, comprising:

a spindle assembly having a drive train that is mechanically independent from the drive train of the vertically operable spindle unit, a housing containing said independent drive train, and a tool coupling rotatably mounted in said housing and connected to the mechanically independent drive train for holding a turning tool, and a connector block for detachably connecting said spindle assembly to said vertically operable spindle unit such that the axis of rotation of said shaft and said tool coupling are transverse to one another, wherein said connector block includes a tapered shank, which is detachably connectable to a female adapter at an end of said spindle shaft, and a stop block assembly detachably connectable to said headstock for preventing said connector block from rotating relative to said headstock and wherein said drive train of said spindle assembly includes an electric motor, and said stop block assembly includes an electrical connector for connecting a source of electrical power to said motor.

3. The angle spindle attachment of claim 2, wherein said connector block includes an angular adjustment mechanism for adjusting an angle between the axis of rotation of said spindle shaft and said tool coupling.

4. The angle spindle attachment of claim 1, wherein said connector block means includes a means for conducting liquid coolant to an interface between a workpiece and a rotating tool held by the tool coupling means of the spindle assembly.

5. The angle spindle attachment of claim 4, wherein said liquid conducting means includes a nozzle means for directing a stream of said coolant to said interface, and a bore means extending through the tapered shank of said connector block means for connecting said nozzle means to a source of pressurized coolant in the shaft of said vertically movable spindle unit.

6. The angle spindle attachment of claim 1, wherein said connector block means includes a rotational adjustment assembly for adjusting the angular position of said axis of rotation of said tool coupling means of said spindle assembly in a plane orthogonal with respect to the axis of rotation of said spindle unit shaft.

8

7. The angle spindle attachment of claim 1, wherein said connector block means includes a clamping means for securing said spindle assembly.

8. The angle spindle attachment of claim 1, wherein said connector block means mounts said spindle assembly such that the axis of rotation of said tool coupling means of said spindle assembly and said shaft of said spindle unit intersect at right angles with respect to one another.

9. The angle spindle attachment of claim 1, wherein said connector block means mounts said spindle assembly such that the axis of rotation of said shaft of said spindle unit and said tool coupling means of said spindle assembly intersect one another.

10. The angle spindle attachment of claim 1, wherein said connector block means includes an angular adjustment mechanism for adjusting an angle between the axis of rotation of said spindle shaft and said tool coupling means.

11. An angle spindle attachment for a spindle unit that is vertically operable with respect to a workpiece, said unit including a spindle shaft rotatably mounted with respect to a headstock, and a drive train for rotating said shaft, comprising:

a spindle assembly having a drive train that is mechanically independent from the drive train of the vertically operable spindle unit, a housing containing said independent drive train, and a tool coupling rotatably mounted in said housing and connected to the independent drive train for holding a turning tool, and a connector block for detachably connecting said spindle assembly to said vertically operable spindle unit such that the axis of rotation of said shaft and said tool coupling are transverse to one another, including a tapered shank at one end that is detachably connectable to a female adapter at an end of said spindle shaft, a clamping mechanism at an opposite end for securing said spindle assembly, a stop block assembly detachably connectable to said headstock for preventing said connector block from rotating, and an angular adjustment mechanism for adjusting an angle between the axis of rotation of said shaft and the axis of rotation of said tool coupling.

12. The angle spindle attachment of claim 2, wherein said connector block mounts said spindle assembly such that the axis of rotation of said shaft of said spindle unit and said tool coupling of said spindle assembly intersect one another.

13. The angle spindle attachment of claim 11, wherein said angular adjustment mechanism includes a pair of opposing plate members connected to opposing sides of said connector block.

14. The angle spindle attachment of claim 13, wherein said angular adjustment mechanism further includes a pair of opposing trunnions on opposite sides of said clamping mechanism for securing said spindle assembly that are journaled in openings present in said pair of opposing plate members.

15. The angle spindle attachment of claim 14, wherein said trunnions are threaded, and wherein said angular adjustment mechanism further includes a pair of locknuts threadedly engaged on said trunnions for securing said spindle assembly such that the axis of rotation of said tool coupling is oriented at a desired angle with respect to the horizontal.

16. The angle spindle attachment of claim 11, wherein said connector block includes a conduit for conducting coolant to an interface between a workpiece and a rotating tool held by the tool coupling of the spindle assembly.

17. The angle spindle attachment of claim 16, wherein said conduit for conducting coolant includes a nozzle for directing a stream of said coolant to said interface, and a bore extending through the tapered shank of said connector block for connecting said nozzle to a source of pressurized coolant in the shaft of said vertically operable spindle unit.

18. The angle spindle attachment of claim 11, wherein said connector block includes a rotational adjustment assembly for adjusting the angular position of said axis of rotation of said tool coupling of said spindle assembly in a plane orthogonal with respect to the axis of rotation of said spindle unit shaft.

19. The angle spindle attachment of claim 18, wherein said rotational adjustment assembly includes a rotational connection between said clamping mechanism and a bottom portion of said connector block, and a set screw for securing said clamping mechanism in a desired rotational position.

20. The angle spindle attachment of claim 11, wherein said clamping mechanism includes a first detachably securable clamping member and a second detachably securable clamping member for circumscribing the housing of the spindle assembly.

21. The angle spindle attachment of claim 11, wherein said connector block is formed from a single, substantially solid metal casting.

22. The angle spindle attachment of claim 10, wherein said angular adjustment mechanism includes a pair of opposing plate members connected to opposing sides of said connector block means.

23. The angle spindle attachment of claim 22, wherein said angular adjustment mechanism further includes a pair of opposing trunnions on opposite sides of said clamping means for securing said spindle assembly that are journaled in openings present in said pair of opposing plate members.

24. The angle spindle attachment of claim 2, wherein said connector block mounts said spindle assembly such that the axis of rotation of said tool coupling of said spindle assembly and said shaft of said spindle unit intersect at right angles with respect to one another.

25. The angle spindle attachment of claim 2, wherein said connector block includes a conduit for conducting coolant to an interface between a workpiece and a rotating tool held by the tool coupling of the spindle assembly.

26. The angle spindle attachment of claim 25, wherein said conduit for conducting coolant includes a nozzle for directing a stream of said coolant to said interface, and a bore extending through the tapered shank of said connector block for connecting said nozzle to a source of pressurized coolant in the shaft of said vertically movable spindle unit.

27. The angle spindle attachment of claim 2, wherein said connector block includes a rotational adjustment assembly for adjusting the angular position of said axis of rotation of said tool coupling of said spindle assembly in a plane orthogonal with respect to the axis of rotation of said spindle unit shaft.

28. The angle spindle attachment of claim 2, wherein said connector block includes a clamping mechanism for securing said spindle assembly.

* * * * *